(12) United States Patent
Henneken et al.

(10) Patent No.: US 7,001,308 B2
(45) Date of Patent: Feb. 21, 2006

(54) SHIFT DEVICE FOR AN AUTOMATIC TRANSMISSION OF A VEHICLE

(75) Inventors: Markus Henneken, Kressbronn (DE); Friedemann Jauch, Tettnang (DE); Franz-Josef Schuler, Kressbronn (DE); Thomas Mauz, Langenargen (DE); Michael Kiefer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 27 days.

(21) Appl. No.: 10/478,356

(22) PCT Filed: May 18, 2002

(86) PCT No.: PCT/EP02/05507

§ 371 (c)(1),
(2), (4) Date: Nov. 21, 2003

(87) PCT Pub. No.: WO02/097307

PCT Pub. Date: Dec. 5, 2002

(65) Prior Publication Data

US 2004/0142794 A1    Jul. 22, 2004

(30) Foreign Application Priority Data

May 25, 2001  (DE) ................. 101 25 700

(51) Int. Cl.
*F16H 59/30* (2006.01)

(52) U.S. Cl. ............... 477/121; 477/123; 477/125; 74/335; 74/473.12; 74/473.18; 74/473.33; 701/52; 701/62; 701/66

(58) Field of Classification Search ............. 477/121, 477/123, 125; 74/335, 473.12, 473.18, 473.33; 701/52, 62, 66
See application file for complete search history.

(56) References Cited

U.S. PATENT DOCUMENTS

| | | | |
|---|---|---|---|
| 4,648,290 A | 3/1987 | Dunkley et al. | 74/866 |
| 4,987,792 A | 1/1991 | Mueller et al. | 74/473 |
| 5,042,327 A | 8/1991 | Stainton | 74/866 |
| 5,408,895 A * | 4/1995 | Chan et al. | 74/335 |
| 5,506,771 A * | 4/1996 | Chan et al. | 701/54 |
| 5,799,539 A * | 9/1998 | Haase | 74/473.18 |
| 5,816,100 A * | 10/1998 | Fowler et al. | 74/335 |
| 5,868,033 A | 2/1999 | Nishino et al. | 74/335 R |
| 6,035,735 A * | 3/2000 | Graf et al. | 74/335 |
| 6,095,002 A * | 8/2000 | Tuson et al. | 74/335 |
| 6,151,977 A * | 11/2000 | Menig et al. | 74/336 R |
| 6,474,186 B1 * | 11/2002 | Vollmar | 74/335 |

FOREIGN PATENT DOCUMENTS

| | | |
|---|---|---|
| DE | 38 07 881 A1 | 9/1989 |
| DE | 38 07 881 C2 | 9/1989 |
| DE | 690 08 911 T2 | 9/1994 |
| DE | 44 45 574 A1 | 7/1995 |
| DE | 197 09 506 A1 | 11/1997 |

(Continued)

*Primary Examiner*—Rodney H. Bonck
*Assistant Examiner*—David D. Le
(74) *Attorney, Agent, or Firm*—Davis & Bujold, P.L.L.C.

(57) ABSTRACT

A shift device for an automatic transmission of a vehicle, particularly of a motor vehicle, is proposed in which the request to change the current ratio of the automatic transmission upon reaching preset operating states of the vehicle can be automatically generated or by manual input in a manual shifting mode. A pulse counter is here provided by way of successive pulses and manual input can be functionally interlinked wherein a shift signal can be generated depending on the linkage.

12 Claims, 1 Drawing Sheet

FOREIGN PATENT DOCUMENTS

| | | |
|---|---|---|
| DE | 197 31 842 A1 | 1/1998 |
| DE | 198 07 346 A1 | 8/1999 |
| DE | 199 51 374 A1 | 5/2001 |
| EP | 0 519 528 A2 | 12/1992 |
| EP | 0 911 207 A2 | 4/1999 |
| WO | WO 77425 A1 * | 12/2000 |

* cited by examiner

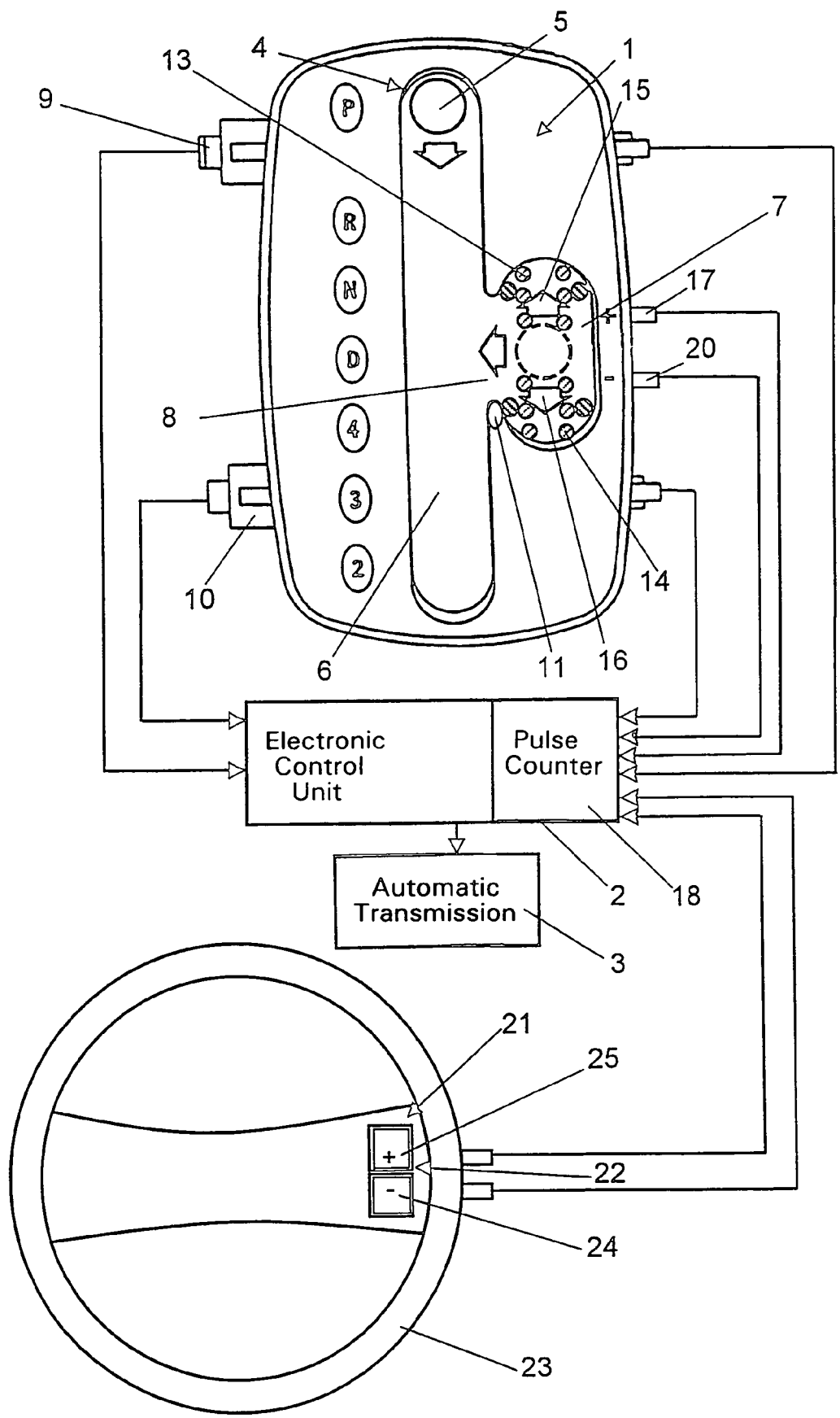

SHIFT DEVICE FOR AN AUTOMATIC TRANSMISSION OF A VEHICLE

According to the type defined in detail in the preamble of claim 1, the invention relates to a shift device for an automatic transmission of a vehicle, particularly of a motor vehicle.

From the practice, shift devices are known in which a driver can select, via a selector lever, an automatic driving mode and a manual driving mode, provided for this purpose is one selector lever in a shifting gate having several sensors. With each sensor is usually associated a shifting position of a dynamic shift program. Thus, for example, with the selector lever can be mechanically selected a shifting position P for parking, R for reverse drive, N for neutral (idling speed) and D for forward drive, in which an automatic shifting between the lowest speed and the highest existing speed is conducted according to one or more of the adjusted speed of the accelerator pedal, the engine rotational speed of the vehicle acceleration, and other important parameters available in an electronic control unit.

Further shift devices are known from the practice which have shifting positions for a maximum upshiftable gear step. It is thus possible, for example with a shifting position "4" to lock a fifth gear when, under certain driving conditions, a too frequent gear change becomes needed between the fourth and the fifth gear while, for example, with a shifting position "2" is prevented an upshift to a higher gear such as when traveling mountain passes, having long uphill gradients or inclined runways. Furthermore, a shifting position for the first gear can naturally be also provided. The development of a shift device with such shifting positions for different shifting ranges results in a better utilization of the engine power while, at the same time, using the braking effect and additionally helps to prevent an unnecessary upshift and downshift.

The shift devices, known from the practice, often have one other shift device for the so-called "inching shift" which gives the driver the possibility of a simplified manual operation, for example, for implementing a sporting driving mode. A shift to a next lower or next higher speed results by tapping a corresponding sensor, via the selector lever or a separate switch or push button, which can be placed on a steering wheel.

Such a shift device has been disclosed in DE 38 07 881 C2 in which a "manual program" of the inching shift can be implemented by means of a second shifting gate disposed parallel with the shifting gate of the dynamic shift program. To activate the manual program, a selector lever is passed via a transverse gate, into a second shifting gate where, in a non-operated position, it is held in neutral position. To trigger upshifts and downshifts in the transmission, said lever is manually swivelled each time; the shifting movements of the selector lever being detected by sensors whose signals enter into the control unit of the automatic transmission.

DE 197 09 506 A1, likewise, describes a shift control system for use in an automatic transmission with which a reduction ratio of the automatic transmission can be changed, via an automatic or a manual input. An automatic shifting control takes place when the motor vehicle is in an operating range in which a manual input for changing the reduction ratio is suppressed, especially for ensuring an overload protection of the automatic transmission. The acceptance of the control command for upshift and downshift is suppressed until lapse of a predetermined time after occurrence of the automatic shifting.

In all described solutions with a manual inching shift, which is provided in addition to a dynamic shift program, a manual upshift is performed by tapping a plus sensor to the next higher gear or a downshift is performed by tapping a minus sensor manually to the next lower gear. The selection possibility for the driver is very limited, particularly resulting in an impairment of the operating comfort when the driver, for example, wishes for an extremely strong acceleration by a downshift of several speeds or a strong upshift. In such a case, the driver must then repeatedly tap the minus sensor or the plus sensor and wait for the corresponding shift order to obtain the desired total change of ratio.

To operatively simplify a downshift or upshift by several gear steps in the manual operation, the arrangement of additional shifting positions, be it in the form of selector lever positions or push button steps, always involves an increased danger of incorrect operation, although it could be provided that there is a shifting position made available for the selector device for single shifting and one other shifting position for a maximum shifting both for an upshift and for a downshift.

The problem on which this invention is based is to provide a shift device for a automatic transmission vehicle operated by an electronic control unit, particularly of a motor vehicle, in which the driver has available, together with an automatic shifting mode, a manual shifting mode in which the driver's wish is satisfied within admissible limits, while maintaining a greater possible operating comfort.

According to the invention this problem is solved with a shift device having the features of claim 1.

With the inventive shift device, where a pulse counter is provided by means of which the successive pulses of a manual input can be functionally interlinked whereby a shift signal can be generated according to the linkage, the driver's wish can be satisfied even after repeated downshifts or upshifts when it lies within admissible operating limits. With the inventive shift device, a correction of a manual input can be taken into account immediately before by an inching pulse.

The inventive shift device thus stands out by offering to the driver a widely larger clearance for manual inputs than is the case in the conventional inching shifts.

In a simple development of the inventive shift device, it can, at the same time, be provided that during the linkage pulses for upshift or downshift be added up and then worked off, a value of the pulse counter preferably being increased during a pulse for upshift and decreased during a pulse for downshift.

To make multiple shifts possible for the driver, such as by means of inching pulses, via a manual input, it is advantageous after registering a pulse to start an applicable locking time within which can be registered other pulses that can be added up.

In an advantageous development of the inventive shift device, a shift signal can be further provided that is issued for multiple upshift while the vehicle is parked. In this manner, the driver is also able to start off in a high gear in manual shifting mode, for example, on an even road.

Other advantages and advantageous development of the inventive shift device result from the other claims, the specification that follows and the drawing.

An embodiment of the inventive shift device is explained in detail with reference to the drawing in the specification that follows.

The single FIGURE of the drawing shows a diagrammatic representation of a shift device for a vehicle operated by an electronic control unit with a plus counter which is optionally operable in an automatic shifting mode or in a manual shifting mode by actuating a selector lever or an inching push button provided on a multifunction steering wheel.

The single FIGURE shows a shift device 1 for an automatic transmission 3 of a motor vehicle, the latter being only symbolically indicated, operated by an electronic control unit 2. The shift device 1, provided for a passenger car, has a first shift device 4 for a dynamic shift program in which by selecting a shifting position P for parking the vehicle, a shifting position R for downshift, a shifting position N for idling speed and a shifting position D for automatic forward drive, different transmission gears to be automatically engaged can be preselected according to input of an adaptive transmission control. For this purpose, a selector lever 5 is provided, acting as a selector device, which is movable in a first shifting gate 6 where sensors are situated for the above described shifting positions. Together with the already mentioned P, R, N and D positions still other shifting positions, "4" for a fourth speed, "3" for a third speed and "2" for a second speed are provided where the shifting is automatically carried out, respectively, between the first gear and the speeds above mentioned.

In addition to the first shifting gate 6 for an automatic shifting mode, a second shifting gate 7 is provided parallel with the first shifting gate 6 for effecting a manual shifting mode in which the selector lever 5 can be reversed via a transverse gate 8. During the position a reversal of the selector lever 5 in the first shifting gate 6 is sensorially detected and issued, via signal transmitting devices 9, 10 to the electronic control unit 2. The sensor 11 is located in the transverse gate 8.

If the selector lever 5 is in the second shifting gate 7, it is kept by springs 13, 14 in a neutral middle position, shown in the FIGURE in broken lines. The selector lever 5 can be moved by manual actuation from said middle position in a first direction (indicated with an arrow 15) for triggering upshifts and, in a second direction (indicated with an arrow 16) for triggering downshifts. The structural configuration of the selector lever, relative to its swiveling in the gate of the shifting device 1, corresponds here to the conventional design.

When the selector lever 5 is pushed in direction 15 for upshifting, it reaches a shifting position "+" where a plus sensor 17 reacts and issues a corresponding signal to a pulse counter 18 (only symbolically shown in the FIGURE) of the electronic control unit 2. Should the driver tap the selector lever 5 in a manner such that it moves from the neutral position in direction of movement 16 to the second shifting gate 7, it thus reaches a shifting position "−" for downshift, a minus sensor 20 issuing a corresponding signal to the pulse counter 18 of the electronic control unit 2.

Together with the shifting gate of the first shift device 4, the shift device 1 has, in addition, a second shift device 21 in which an inching push button 22 is provided as a selector device on a multifunction steering wheel 23. In the design, shown very schematized in the FIGURE, the inching button 22 has a first push button 24 for downshifts and a second push button 25 for upshifts; the driver being able to effect a manual input on the electronic control unit 2 by tapping the inching push button 22 in upshift direction or downshift direction.

When actuating the selector lever 5 and when actuating the inching push button 22, the successive pulses of a manual input are functionally interlinked by means of the pulse counter 18, a shifting signal being generated according to the linkage.

During the linkage, pulses for upshift "+" or downshift "−" are added up and then finished, a counter value of the pulse counter 1 existing during a pulse for upshift being increased by a value "+" and during a downshift decreased, accordingly, e.g., the value "1" is subtracted. The counter of the inching pulse counter 18 is worked off until it is at "0". As long as the counter has a value above "0", an upshift is requested and when the counter is below "0", a downshift is requested.

To make multiple shifts possible, e.g., double downshifts via inching pulses, an applicable locking time is started after registering a pulse, within which other pulses that can be added up, can be registered. After lapse of said specific locking time, e.g., a counter value less than "−2" is found, this leads to the request of a double downshift or maximum downshift.

Via the storage of pulses, a shift signal for multiple downshifts or multiple upshifts can be generated, but a shift signal for a shift of lower order is issued when a requested shift of higher order is detected as inadmissible. For example, if a requested double downshift is not possible due to excessively high output rotational speeds, the request is converted to a simple downshift.

In the linkage of the pulses issued by tapping the plus position or minus position of the selector lever 5 or of the inching push button 22 on the pulse counter 18 of the electronic control unit 2, it is further provided that in case of a pulse for shifting in one direction, which at least one pulse for shifting in the opposite direction has preceded, a shifting signal corresponding to the last pulse is issued and at least one preceded pulse be canceled. Alternatively, it can also be provided that the issuance of a shift signal be omitted in such a case.

This function is provided for the case that a driver delivers several inching pulses in one shifting direction and immediately thereupon undertakes an inching pulse in the opposite direction. All previous unshifted inching pulses are then canceled, since it is to be assumed that a hectically acting driver would be quickly inclined to provide another gear ratio and, therefore at the same time, taps several times establishing that the desired ratio has been exceeded wherefore an inching pulse in the opposite shifting direction is assumed. When an upshift is requested and the counter of the inching pulse counter 18 is in the negative range, the counter is set at "1" or "0". The analogous applies to the case of a requested downshift when the counter is in positive range, it being here set at "−1" or "0".

In one other design, it can be provided that after an inching pulse a time lag is started with no other inching pulse being registered during said time lag, i.e., during the transmission shifting, no inching pulses are accepted. Moreover in other designs, it is also possible to provide that when several inching pulses appear within an additional locking time a hardware error such as interference voltages or feedbacks in the inching actuation be accepted. In such a case, it can be provided that the manual operation can be quit even if the selector lever is in the manual shifting gate 7.

In the preferred design (shown here), a shift signal for a multiple upshift is provided that can be issued even while the vehicle is parked. This means that during parking of the vehicle, it is possible to tap the second or third gear and also tap back again in order, should that be the case, to make starting off at a higher gear possible, e.g., on an even road. One condition here is that a maximum load pedal position is less than a maximum, preset threshold value. If this condition is not met, the higher gear selection is ignored and it is started off at a lower gear in order to ensure protection for the transmission.

Even when the driver has started off in the second or third gear in the instant design of the shift device 1, a downshift to the lowest ratio step, i.e., to the first gear, is always allowed when the vehicle is stopped from higher speed above a predefined higher speed limit or the vehicle speed is reduced down to a speed coordinated with the first gear.

In case the driver, after starting off in the second or third gear immediately or within a brief preset time window, again stops and a vehicle stoppage is thus detected before an applicable speed limit and a preset maximum load pedal position are reached, a request of starting off from a vehicle stoppage to a higher ratio step is stored in the electronic control unit 2.

However, if during the start from a higher ratio step the applicable speed limit or the maximum load pedal position is exceeded, or a pulse of the manual input exists since the driver, for example, taps one other gear, the request for a higher ratio step is canceled for the case of a repeated starting off from the stoppage of the vehicle.

In the instant shift device 1, it is further provided that on the basis of an inching shift program stored in the electronic control unit 2 when reaching preset operating states of the vehicle, a shift is automatically triggered, a pulse of the manual input is ignored or only a first pulse of the manual input is stored. The automatic shifting is thus interpreted as wished by the driver and the additional shifting request by an inching pulse of the driver can be ignored. This applies both to the combination of an automatic upshift and a manual input of an upshift and to an automatic downshift and a manually requested downshift. Other combinations are not allowed based on the rotational speed limiting lines being exceeded. To accept a subsequent inching shift by manual input of a pulse, one or more of the following events of the automatic shifting must occur thus, the synchronous rotational speed has to be reached; the state of the disengaging clutch have reached a specific value; the state of the clutch to be engaged have reached a specific value; an engine engagement be terminated; the differential speed to the old gear have reached a maximum value; the differential speed to the new gear have reached a minimum value, and the state "shift terminated" have been reached.

In addition, for the case that a shift signal resulting in accordance with the linkage and which has been detected as inadmissible for the existing operating state, it is provided that the pulses of the manual input leading to the linkage result is stored for a preset time. For example, if the driver requests a downshift by tapping and the downshift cannot be carried out due to a rotational speed limiting value having been exceeded, the inching pulse is stored for a preset time when the driver actuates the brake and does not actuate the accelerator pedal. It is thus obtained that during the retardation the engine braking effect is optimally used, i.e., the downshift is performed at maximum admissible rotational speeds.

Even though with the instant shift device, the driver is to be given the largest possible clearance for the manual shifting mode, it is provided for protection of the transmission and of the engine that the manual shifting mode is quit when, for example, an inadmissibly high temperature of the vehicle transmission and/or of the engine has been found, the there is selected shift characteristic lines of the automatic shifting mode which lead to lowering the temperatures in question.

It is obvious that the invention is not tied to the above described structural design of the shift device, but can be applied to any selector devices of different structural design for implementing a manual shifting mode and an automatic shifting mode. At the same time, it is to be maintained that by the expression "tippen" (tap) that a pulse input by actuation of a rocker switch or rotary switch is also to be understood.

The inventive device is particularly adequate for motor vehicles having an electronically operated vehicle automatic transmission which can be both a stepped automatic transmission and a CVT automatic transmission. But applications to other vehicles are also conceivable as, for example, motorcycles or watercraft having electronically controlled vehicle automatic transmissions, since here an operation in automatic shifting mode or manual shifting mode is also optionally possible and the driver's wish is to be satisfied as extensively as possible in the manual shifting mode.

REFERENCE NUMERALS 1 shift device
2 electronic control unit
3 automatic transmission
4 first shift device
5 selector device, selector lever
6 first shifting gate
7 second shifting gate, manual gate
8 transverse gate
9 signal transmitting device
10 signal transmitting device
11 sensor
13 spring
14 spring
15 shift moving device of the selector device for upshift
16 shift moving device of the selector device for downshift
17 plus sensor
18 pulse counter
20 minus sensor
21 second shift device
22 selector device, inching push
23 multifunction steering wheel
24 first push button
25 second push button

The invention claimed is:

1. A shift device for an automatic transmission of a vehicle, particularly of a motor vehicle, in which a command to change a current ratio of said automatic transmission (3) upon reaching preset operating states of the vehicle can be generated automatically or by manual input in a manual shifting mode, the shift device comprising:

a pulse counter (18) for functionally interlinking a plurality of successive pulses in a manual input by adding up pulses for the upshift (+) or working off pulses for the downshift (−);

a counter value determined by said pulse counter (18) being increased during a pulse for the upshift (+) and decreased during a pulse for the downshift (−), a shifting signal is generated according to the interlinkage of the plurality of successive pulses; and wherein a shifting signal for a multiple upshift can be issued while the vehicle is parked and said shifting signal for multiple upshift can be issued while the vehicle is parked when a load pedal position is less than a maximum threshold value.

2. The shift device according to claim 1, wherein an applicable locking time is started upon registering a pulse, other pulses that can be added during the locking time are registered.

3. The shift device according to claim 1, wherein a shifting signal for multiple downshifts or multiple upshifts can be generated according to the interlinkage.

4. The shift device according to claim 1, wherein a shifting signal for a shifting of a low order is issued when a requested shifting of a higher order is detected as inadmissible.

5. The shift device according to claim 1, wherein a shifting signal for a shifting to a lower ratio step is issued as requested when the load pedal position is above the maximum threshold value.

6. The shift device according to claim 1, wherein a downshift to a lowest ratio step is allowed when a vehicle speed is reduced from a value above a predefined high speed limit to a value coordinated with the lowest ratio step.

7. The shift device according to any claim 1, wherein during a pulse for shifting in one direction which has preceded at least one pulse for shifting in the opposite direction, a shifting signal is issued corresponding to the last pulse and the at least one preceded pulse is canceled.

8. The shift device according to claim 1, wherein during a pulse for shifting in one direction which has preceded at least one pulse for shifting in the opposite direction the issuance of a shifting signal is omitted and the at least one preceded pulse is canceled.

9. The shift device according to claim 1, wherein during a shifting which had been automatically canceled based on preset operating states having been reached, a pulse of the manual input is ignored or only a first pulse of the manual input is stored.

10. The shift device according to claim 1, wherein during a shifting signal resulting in accordance with the interlinkage and which has been detected as inadmissible for the existing operating state, the pulses of the manual input leading to the interlinkage result are stored for a preset time.

11. A shift device for an automatic transmission of a vehicle, particularly of a motor vehicle, in which a command to change a current ratio of said automatic transmission (3) upon reaching preset operating states of the vehicle can be generated automatically or by manual input in a manual shifting mode, the shift device comprising:
  a pulse counter (18) for functionally interlinking a plurality of successive pulses in a manual input by adding up pulses for the upshift (+) or working off pulses for the downshift (−);
  a counter value determined by said pulse counter (18) being increased during a pulse for the upshift (+) and decreased during a pulse for the downshift (−), a shifting signal is generated according to the interlinkage of the plurality of successive pulses;
  a shifting signal for a multiple upshift can be issued while the vehicle is parked; and
  wherein a request to start off from a vehicle stoppage to a higher ratio step is stored when after starting off to the higher ratio step within a preset time window a vehicle stoppage is detected before an applicable speed limit and a preset maximum load pedal position are reached.

12. The shift device according to claim 11, wherein the request for the higher ratio step for the ease of a repeated start off from stoppage of the vehicle is canceled when the applicable speed limit or the maximum load pedal position are exceeded or a pulse of the manual input is present.

* * * * *